United States Patent [19]

Northan et al.

[11] 3,714,069

[45] Jan. 30, 1973

[54] CORROSION PREVENTING COMPOSITION

[75] Inventors: Barbara J. Northan, Chicago, Ill.; David B. Boies, Columbia, Md.

[73] Assignee: The United States of America as represented by the Secretary of the Navy

[22] Filed: Dec. 17, 1970

[21] Appl. No.: 99,285

[52] U.S. Cl. ............252/389 A, 21/2.5 A, 21/2.5 R, 106/14, 252/389 R, 117/105, 117/134, 252/395

[51] Int. Cl. ..............................................C23f 11/16

[58] Field of Search..252/389 A, 395, 138, 161, 305; 21/2.7, 2.5; 106/14; 117/105, 134

[56] References Cited

UNITED STATES PATENTS

| | | | |
|---|---|---|---|
| 2,829,114 | 4/1958 | Hervert | 252/389 |
| 2,921,908 | 1/1960 | McCune | 252/389 |
| 3,471,403 | 10/1969 | LeSuer et al. | 252/389 |
| 3,487,018 | 12/1969 | Troscinski | 252/389 |

*Primary Examiner*—Leon D. Rosdol
*Assistant Examiner*—Irwin Gluck
*Attorney*—Richard S. Sciascia, Q. Baxter Warner and Gayward N. Mann

[57] ABSTRACT

A composition for significantly improving corrosion protection comprising the combination of an alkylaryl sulfonate with a surface active agent including partial organic phosphate esters neutralized with ethylenediamine or barium. An aromatic petroleum hydrocarbon resin is added to enhance protection in crevice areas and to improve handling characteristics.

5 Claims, No Drawings

CORROSION PREVENTING COMPOSITION

CROSS-REFERENCES TO RELATED APPLICATIONS

Patent application Ser. No. 789,067 filed Jan. 2, 1969 now U.S. Pat. No. 3,642,653 entitled "Water Displacing Corrosion Preventive" is related to the present invention.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to new compositions of matter and more particularly to new compositions which retard and prevent corrosion.

2. Description of the Prior Art

Corrosion that occurs at damaged areas of paint films, particularly on aluminum metal surfaces, presents a serious problem because it is concentrated at small areas which leads to metal loss with eventual perforation and possible structural failure. The use of a temporary corrosion preventive at such damaged areas is highly desirable to protect the surface until it can be repainted.

Intensified work on this problem has resulted in an effective water-displacing corrosion preventive containing a petroleum sulfonate, a phosphate ester and a microcrystalline wax upon which application Ser. No. 789,067 has been filed in the U. S. Patent Office.

This disclosure describes an improvement over such previously filed invention and includes essentially the replacement of the microcrystalline wax by a hydrocarbon-soluble resin with resulting improvement in corrosion protection at crevice areas and in handling characteristics.

SUMMARY OF THE INVENTION

The present invention includes a new composition for retarding corrosion comprising a combination of a natural petroleum sulfonate and a salt of a complex ester. A hydrocarbon-soluble resin is added to provide significant enhancement of corrosion protection and to provide better handling characteristics.

This composition is particularly useful when applied to microcracks and crevice areas of paint films on metal surfaces.

STATEMENT OF THE OBJECTS OF THE INVENTION

An object of the present invention is to provide a corrosion preventive composition for application to damaged areas of paint films on metal surfaces which is superior to those of the prior art.

Another object of the present invention is to provide a novel composition which is colorless, easily applied, flexible, nontacky and easily removed.

A further object of the present invention is to provide a novel temporary corrosion preventive compound which is both economical and effective.

Other objects, advantages and novel features of the invention will become apparent from the following detailed description of the invention.

DESCRIPTION OF THE PREFERRED EMBODIMENT

The present invention is a water-displacing temporary corrosion preventive composition comprising a combination of 2 parts of alkylaryl sulfonate and 1 part of a suitable surface active agent. A hydrocarbon-soluble resin is added to increase corrosion protection in crevice areas and to enhance handling characteristics of the composition in the following relationship:

2 parts alkylaryl sulfonate plus
1 part surface active agent dissolved mineral = 50% spirits to form a 25 percent solution
Hydrocarbon-soluble resin dissolved in mineral = 50% spirits to form a 25 to 50 percent solution This formulation may be packaged in a pressurized spray container using dichlorodifluoromethane (Freon-12) as the propellant. Other suitable means of dissolving and utilizing the present composition may also be employed.

In general the alkylaryl sulfonates employed had to both displace water and prevent corrosion. Of the vast hordes of alkylaryl sulfonates available, only those which were anionic and of relatively low molecular weight were effective. These chemicals were equally effective as either sodium or ammonium salts. In particular sodium sulfonate, ammonium sulfonate and barium sulfonate produced the best results.

Of the several phosphate-based surface active agents tested, the only ones which proved useful were salts of partial phosphate esters represented generally by the formula R–O–P(O)(OH)OM wherein R is an organic group, including an ethoxylated alkyl phenol, and M is a salt-forming cation, including barium or an amine. R is chosen to provide the proper hydrophylic/hydrophobic ratio upon which the effectiveness of these phosphate based chemicals appeared to be dependent. Specifically barium salt of a partial phosphate ester and an ethylenediamine salt of a partial phosphate ester were found to provide the best results.

The following table documents the results of water displacement and corrosion tests. Test specimens were polished and sprayed with the salt solutions. After one minute, one milliliter of test compound was allowed to run down the specimen. The specimen was then rated for water displacement and then placed in a closed container above a water bath. After 24 hours the specimen was cleaned to remove the test material and the corrosion products. It was then examined microscopically for evidence of corrosion. Other specimens were also prepared as above and using the same test compounds were positioned in sea spray apparatus and exposed for varying time periods. They were then examined microscopically after being cleaned for evidence of corrosion. Other similarly prepared specimens were dipped in aqueous solutions in controlled time sequences after which they were cleaned and microscopically examined.

TABLE I

Results of water-displacement and corrosion tests

Water     Corrosion

| Chemical | Type | Displacement | General | Pitting |
|---|---|---|---|---|
| Sodium sulfonate | Anionic | Effective | Slight | None |
| Ammonium sulfonate | Anionic | Effective | Slight | Slight |
| Barium sulfonate | Anionic | Effective | None | Slight |
| Partial phosphate ester, barium salt | Anionic | Effective | Slight | None |
| Partial phosphate ester, ethylenediamine salt | Anionic | Effective | Slight | None |
| Dimethyl cocoamine | Cationic | Effective | None | Severe |
| Ethoxylated cocoamine | Cationic | Effective | Severe | Severe |
| Oleic acid imidazoline | Cationic | Effective | None | Severe |
| Ethoxylated nonylphenol | Nonionic | Effective | Moderately Severe | Moderately Severe |
| Fatty alkanolamide | Nonionic | Effective | Severe | Severe |

All test chemicals were satisfactory in being easily applied, flexible, nontacky and easily removable. Moreover all compounds were satisfactory in displacing water which is a necessary characteristic in any corrosion preventive composition. However only those which were anionic showed acceptable characteristics against corrosion.

Further tests indicated that the sulfonates provided better film retention for long time exposure while the phosphate ester surface active agents provided the best protection against a pitting corrosion.

A hydrocarbon-soluble resin is added to the composition to significantly improve corrosion protection in crevice areas. The resin is dissolved as a 25 to 50 percent solution in mineral spirits said resin being an aromatic petroleum hydrocarbon resin. Water displacement in crevice areas as well as the ability to prevent rewetting has been shown to be attributable to the hydrocarbon-soluble resins.

Obviously many modifications and variations of the present invention are possible in the light of the above teachings. It is therefore to be understood that within the scope of the appended claims the invention may be practiced otherwise than as specifically described.

What is claimed is:

1. A composition utilized as a deterrent against corrosion consisting in intimate admixture:
    an anionic low molecular weight alkylaryl sulfonate;
    an anionic surface active agent having the general formula:

    R–O–P(O)(OH)OM in which R is an ethoxylated alkyl phenol and M is a salt forming cation selected from the group consisting of barium and an amine; and
    a hydrocarbon-soluble resin to enhance corrosion protection and improve handling characteristics of the composition, said resin being an aromatic petroleum hydrocarbon resin and which is soluble in a 25 – 50 percent solution of mineral spirits;
    the ratio of said sulfonate to said surface active agent being about 2:1, and the total amount of said combined sulfonate and surface active agent being about 50 percent with the amount of said resin also being about 50 percent.

2. The composition as defined in claim 1 wherein:
    the alkylaryl sulfonate is selected from the group consisting of sodium sulfonate, ammonium sulfonate and barium sulfonate;
    the anionic surface active agent is selected from the group consisting of a barium salt of a partial phosphate ester and an ethylenediamine salt of a partial phosphate ester; and
    the hydrocarbon-soluble resin is dissolved as a 25 to 50 percent solution in mineral spirits.

3. The composition as defined in claim 2 wherein the combination of sulfonate and surface active agent are dissolved as a 25 percent solution in mineral spirits and the resin is dissolved as a 25 to 50 percent solution in mineral spirits, said sulfonate and surface active agent as well as the resin both being present in the composition in a 1:1 ratio and packaged in a pressurized container utilizing dichlorodifluoromethane as the propellant.

4. An anti-corrosion composition comprising in intimate admixture:
    sodium sulfonate;
    barium salt of a partial phosphate ester; and
    a hydrocarbon soluble resin, said resin being an aromatic petroleum hydrocarbon resin soluble in a 25 – 50 percent solution of mineral spirits;
    said sodium sulfonate and barium salt being present in a ratio of about 2:1 with said ratio of sulfonate and barium salt comprising about 50 percent of the composition and the hydrocarbon-soluble resin comprising the remaining 50 percent.

5. The anti-corrosion composition of claim 4 wherein said sodium sulfonate and barium salt are dissolved as a 25 percent solution of mineral spirits and the resin dissolved as a 25 to 50 percent solution of mineral spirits, each solution present in the composition in a 1:1 ratio and packaged in a pressurized container utilizing dichlorodifluoromethane as the propellant.

* * * * *